United States Patent [19]

Doheny

[11] Patent Number: 4,874,665

[45] Date of Patent: Oct. 17, 1989

[54] HEAT SHRINKABLE WRAPS

[75] Inventor: Anthony J. Doheny, Natick, Mass.

[73] Assignee: The Kendall Company, Boston, Mass.

[21] Appl. No.: 236,427

[22] Filed: Aug. 25, 1988

Related U.S. Application Data

[62] Division of Ser. No. 3,091, Jan. 14, 1987.

[51] Int. Cl.$^4$ .............................................. C09J 7/02
[52] U.S. Cl. .................................... 428/345; 428/910; 428/500
[58] Field of Search ........................ 428/910, 500, 345

[56] References Cited

U.S. PATENT DOCUMENTS

| | | | |
|---|---|---|---|
| 3,297,819 | 1/1967 | Wetmore | 156/86 |
| 3,455,337 | 7/1969 | Cook | 285/21 |
| 3,861,972 | 1/1975 | Glover et al. | 156/86 |
| 4,447,488 | 5/1984 | Simms et al. | 428/217 |

FOREIGN PATENT DOCUMENTS

| | | | |
|---|---|---|---|
| 90739 | 5/1985 | Japan | 156/86 |
| 839138 | 6/1960 | United Kingdom | 158/86 |

*Primary Examiner*—Edith Buffalow
*Attorney, Agent, or Firm*—Alvin Isaacs

[57] ABSTRACT

Novel processes for preparing a heat shrinkable film by first orienting the film and thereafter irradiating a major surface of the oriented film with low energy radiation to effect differential crosslinking throughout the thickness of the film, the opposed surface of the film being characterized as being substantially non-crosslinked; and films and tapes prepared thereby.

5 Claims, No Drawings

HEAT SHRINKABLE WRAPS

This is a division of application Ser. No. 003,091 filed Jan. 14, 1987.

BACKGROUND OF THE INVENTION

The present invention relates to heat shrinkable films and to adhesive tapes having a heat shrinkable backing More particularly, it relates to heat shrinkable pipewraps, e.g. for protecting from environmental forces and stresses the joints of pipeline such as those contemplated for inground implantation.

The concept of preparing heat shrinkable films is well known and the patent literature is replete with references thereto. In general, the prior procedures include the steps of crosslinking, e.g. chemically or by irradiation, and stretching to orient While not intended to be a complete survey of the rather extensive patent literature in what may be said to be a crowded art, the following patents are nevertheless considered to be relevant for a clearer understanding of the nature and objects of the present invention.

U.S. Pat. No. 3,022,543 relates to a shrinkable film for packaging foodstuffs, e.g. packaging meat by the cryovac process, the film being produced by the steps of: (1) stretching a polymer such as polyethylene where above room temperature in at least one direction; (2) cooling to at least room temperature; (3) radiating, preferably with electrons at a specified dosage; (4) heating the irradiated film at a temperature where it will soften sufficiently to stretch; (5) bilaterally stretching to orient the polymer at this elevated temperature; and (6) cooling while under tension.

U.S. Pat. No. 3,144,398 relates to the preparation of irradiated polyethylene which can be readily changed from a stretched to a shrunken condition The objectives are said to be accomplished by cold stretching the polyethylene at a temperature up to 65° C., e.g. by cold calendering, and then irradiating at a specified dosage, preferably with electrons.

U.S. Pat. No. 3,144,399 relates to an irradiated, biaxially oriented polyethylene stretched at least 100% in each direction and below the break limit. The polyethylene is first irradiated at a specified dosage, then heated to or beyond its transparent point and stretched to orient. The stretched condition is maintained while cooling to room temperature.

U.S. Pat. No. 3,455,337 relates to a differentially irradiated crosslinked polymeric heat recoverable article, tubing being particularly disclosed, characterized by containing a sufficient crosslink density near one surface to be substantially infusible and containing a gradual decreasing density of crosslinking throughout its thickness, the opposed surface being substantially non-crosslinked The article is formed by subjecting it to a dosage of irradiation insufficient to render the opposed surface infusible. Once the tubing has been differentially crosslinked, it is heated and then subjected to differential pressure between the inside and outside, the pressure being sufficient to cause the tube to expand in a controlled fashion.

U.S. Pat. No. 3,886,056 has for its objective to prepare form polyethylene having a high crystallinity a polyethylene having highly raised melting and softening temperatures, improved transparency and excellent dimensional stability at high temperatures. This objective is said to be accomplished by irradiating with a dosage of 0.2–16 Megarads to produce a crosslinked polyethylene having a gel content of at least one weight percent; extending the crosslinked polyethylene in at least one direction at a temperature of at least the anisotropic melting point of at least 150° C.; and then cooling.

U.S. Pat. No. 3,949,110 discloses a method of making heat shrinkable tubing including the steps of irradiating the tube, heating to at least the softening temperature, partially inflating and then thermosetting by cooling.

U.S. Pat. No. 3,988,399 relates to heat recoverable wraparound sleeves for pipe joints, cables, wire splices and the like which posses the ability to curl in involute fashion upon the application of heat. As is disclosed, for example in Col. 6, one or both primary exterior faces can be coated with a suitable adhesive U.S. Pat. No. 4,348,438 discloses a process for preparing shrink wraps from a homopolymer of ethylene or a copolymer of ethylene with up to 20 weight per cent of one or more other monomers. As disclosed, the film is uniaxially cold-oriented at a temperature of at least 5° C. below the film's melting point, irradiated with ionizing radiation and sealed along a seam running perpendicular to the direction of orientation. The orientation, which is preferably carried out before orientation, is at a dosage of 1–20 Megarads, about 3 to about 5 Megarads being stated to be preferred.

U.S. Pat. No. 4,469,742 relates to a multilayer cook-in shrink film comprising: (1) a specified sealing layer; (2) a shrink layer; (3) a specified adhesive layer; (4) a barrier layer; (5) another adhesive layer; and an abuse layer, the respective layers being melt bonded and irradiated to crosslink sufficient to resist delamination during use.

U.S. Pat. No. 4,517,234 relates to a flat length of heat recoverable material having integral latching means so that the material may be wrapped around a cable, pipe, etc., latched together and then shrunk.

U.S. Pat. No. 4,521,470 relates to a system for enclosing an object by installing consecutively or as a single article: (a) a heat-softenable adhesive; (b) a specified thermoplastic polymeric material; and (c) a heat-recoverable cover, and thereafter heating to cause recovery (shrink).

U.S. Pat. No. 4,590,020 teaches an oriented high density polyethylene film having maximum crosslinking at the surfaces and minimum crosslinking inwardly. The film is prepared by crosslinking opposed surfaces by irradiation with electron rays in such a manner that the degree of crosslinking decreases from the surfaces inwardly so that the outer layer portions have gel fractions between 20–70% and the middle layer portion has a gel fraction between 0–5%; and thereafter heating and stretching to orient and produce a film between 10–50 microns. As is stated in Col. 3, both sides of the film should be irradiated with the same dosage, the penetrating power of the electron rays being properly adjusted according to the thickness by changing the applied voltage or by using a shield.

As mentioned previously, the prior art is replete with references to shrink films and the aforementioned patents are not to be construed as constituting a full survey of the art. However, they are considered as illustrative for purposes of comprehending the nature and objects of the invention to be described in detail hereinafter.

In general, the present invention is directed to novel heat-shrinkable films and tapes, and to novel procedures for preparing same. More particularly, it is directed to novel protective wraps which are particularly useful for tubular metal objects such as pipes, e.g. pipelines intended for inground implantation, as well as for cables, wire splices and the like. The invention will accordingly be discussed in detail hereinafter by reference to pipewraps, a primary object of this invention.

It is well known in the art to provide an overwrap for pipelines in order to protect them from degradative stresses and forces after placement in the ground. An efficacious protective wrap of this description will in general comprise a rubber-based adhesive on the pipe surface and an outer tough corrosion and weather resistant film overlying the adhesive layer. Typically, this is accomplished by a protective adhesive wrap comprising a rubber-based adhesive carried on a polyolefinic film backing. Optionally, a primer coating may first be applied to the pipe surface in order to increase adhesion It would be most desirable to provide a so-called shrinkwrap of this description to insure complete adhesion of the tape to the pipe and thus avoid problems such a spiral void, as will be discussed in more detail hereinafter. However, prior systems for providing a polyethylene or other polyolefinic shrinkwrap for this purpose have proved inadequate for various reasons.

As is known, a polyolefinic film which has been oriented by stretching in the machine direction, will shrink when heated above its crystalline melting point due to the relaxaion of the orientation. However, this concept is not in itself practical for preparing adhesive shrink wraps for pipes. The film backing for the adhesive will have no equilibrium or "rubbery" modulus above its melting point to generate the stresses necessary for adhesive flow. Accordingly, the tape will pull itself apart when it shrinks against a constraint, e.g. a pipe joint.

For example, a blend of high and low densisty polyethylene such as the backing on a 980 adhesive tape (trade designation of the Kendall Company, assignee of the instant invention), comprising a high density (HDPE):low density (LDPE) polyethylene blend, will begin to shrink when heated above the low density melting peak, but it will still maintain some strength if the shrink temperature is below the melting point of the HDPE. This could in theory be useful if the shrink temperature could be controlled to a narrow range of about 10°-15° C. between the two melting endotherms. However, this is not viable in contemplated commercial applications of heat to shrink the film.

It is also known that crosslinking will impart strength above the melting point to a polyolefinic film. For instance, a method of imparting strength to polyethyleme above its melting point(s) is to crosslink so that the film's 100% modulus at 150° C. is between 25 and 100 psi. This has not previously been attractive for commercial production since the uniform crosslinking of the thick polyethylenes which would be utilized requires very high energy electron beams for irradiation which in turn would be both expensive and require considerable manufacturing floor space for radiation shielding. More importantly, the penetrating ionizing radition passing through the film backing would destroy most, if not all of the contemplated rubber-based adhesives. In other words, an extraordinary R & D formulation effort would be required to provide a rubber-based adhesive suitable for the pipewrap which would not be severely damaged by the radiation.

On the other hand, applying the adhesive by calendering onto the surface of the film which has previously been crosslinked is also not feasible, as the adhesive would not adhere sufficiently.

A primary task of this invention, accordingly, is to provide a heat shrinkable polyolefin film which either carries a rubber-based adhesive layer, i.e. in the form of an adhesive tape, or which can be adhered securely over an adhesive layer applied in a separate step around the pipe or pipe joint.

Another object is to provide novel procedures for preparing heat shrinkable adhesive tapes, which procedures are simple, cost-effective and produce tapes possessing the adhesion and physical characteristics for protecting articles from the degradative environmental forces and stresses to which they are subjected in use.

BRIEF DESCRIPTION OF THE INVENTION

In accordance with this invention, the aforementioned objectives are accomplished by first orienting the polyolefinic film by stretching, e.g. on the order of 10-200% in the machine direction and then irradiating a surface of the thus oriented film with a low energy electron beam to provide a controlled differential crosslinking throughout its thickness from the irradiated surface, the degree of crosslinking thus decreasing from a sufficient degree of crosslinking at the irradiated surface to substantially no crosslinking at the opposed surface.

In the preferred embodiment, a heat shrinkable adhesive tape is provided by applying an adhesive layer, e.g. a rubber-based adhesive to the non-irradiated surface at some stage in the manufacturing process. The adhesive may, for example, be applied after orienting and crosslinking or after orienting and prior to crosslinking.

However, in the most preferred embodiment, the film is prepared along with its adhesive coating in a single calendering step and orientation is accomplished by stretching the thus formed tape as it comes off the calender rolls, e.g. by adjusting the tension on the take-up roll to provide the desired degree of stretching The uncoated or backing side of the tape is thereafter subjected to the depthwise crosslinking, as described above.

DETAILED DESCRIPTION OF THE INVENTION

In order to prevent corrosion and/or other degradative forces form attacking pipelines, it is common practice to apply a protective cover to the surface of the pipe. While in its simplest form, this protective cover could be an anti-corrosion coating, for optimum longevity, especially for inground pipelines, the protective system will at least consist of an outer film or adhesive tape which is typically spirally wound around the pipe.

In a typical anti-corrosion system currently in use, a primer coating is first applied to the surface of the pipe and over this primer coating a pressure-sensitive tape having a tough, abrasion-resistant backing is then wound.

In this typical pipeline laying system, sections of pipe of predetermined length, e.g. on the order of 40 feet and having a pipewrap assembled in the field for inground implantation.

If the end sections to be abutted and joined are so wrapped, the end sections are stripped of the protective wrap and then welded together. A protective wrap, e.g. of the foregoing description, is then placed over the pipe joint and adjacent portions of the respective pipewraps in order to secure the pipe joint which can be said to be the weakest link in the pipeline and hence requires the most protection form environmental forces.

Whether it be the pipewrap extending along the length of the individual pipe sections or the wrap covering the joint between adjacent pipe sections, it can be stated in general that anti-corrosion protective tapes that are applied to inground pipeline structures are often subjected to rather severe long-term shearing forces derive from the surrounding soil. The magnitude of these shearing forces depends on several factors, including amongst others: (a) the type of soil; (b) the tectonic forces surrounding the implanted pipeline; (c) the size of the pipe; (d) axial site emplacement; and (e) the range of thermal expansion as well as its contents.

In order to understand how each of the above factors affected the overall shear stress imparted on an inground pipeline tape, one must first consider the forces acting upon implanted pipelines.

Frictional forces acting between the pipeline anti-corrosion protective tape and the surrounding soil are the primary source of shear stress. Frictional forces are here defined as the product of the frictional coefficient between the pipeline coating and the soil and the normal forces acting upon the pipe. As the coefficient of friction depends upon both the nature of the pipeline coating as well as the surrounding soil, it will be found to vary in different applications. Olefin polymer pipeline protective coatings, such as polyethylene, or the like, inherently exhibit lower coefficients of friction, as the protective tape outer surface is smooth and substantially non-adherent.

Other factors having importance in these considerations are the weight of the pipe, including its contents. In addition, since the normal force will vary depending on the axial position around the pipe diameter, the frictional force and hence the shearing forces will also be found to vary around the diameter of the pipe.

The result of the long-term shear forces on a pipeline protective coating is referred to as "soil stress". Soil stress on an anti-corrosion protective coating generally results from the structural shear forces which cause he protective coating to creep along the pipeline peripheral surface. Creep is, in essence, a long-term visco-elastic, or "cold-flow" phenomenon, common to all polymeric substances, The amount of creep, will depend upon physical properties of a coating. Since the physical properties (i.e. modulus) of a coating will he temperature dependent, temperature becomes a decisive element in determining the amount of creep. At low temperatures, the propensity of the protective coating to creep will be substantially reduced, while at elevated temperatures, the likelihood of creep will be significantly increased, other factors remaining the same.

The prior art has addressed these problems with various chemical approaches directed to improving the cohesive nature of the adhesive, thereby increasing resistance to shear and creep.

However, improvements in the chemistry of the adhesive system cannot be a total solution to the problems created by soil stress and creep. The physical characteristics and/or geometry of the pipe wrap inherently provide areas of the pipe which are not adequately adhered to the tape. This is true even if the pipe surface is smooth and uniform.

When the tape is wound over the surface of the pipe, an overlap area is created where the thickness of this overlap area is equal to twice the thickness of the tape. The overlap runs a spiral path along the length of the pipe, and the presence of this spiral overlap poses three problems adjustable and will be regulated, in accordance with per se known procedures, depending upon the selected materials and the thicknesses desired. In this preferred embodiment, orientation is effected by adjusting the speed of the takeup roll in the calendering step to created a tension sufficient to stretch the tape in the machine direction, e.g. to increase the length of the tape from about 10 to about 200%, an increase on the order of about 50% being preferred.

If the requisite orientation is not obtained during the calendering step as described above, the tape may be subjected to a post-drawing where the tape is heated and then stretched to orient in the machine direction to achieve the desired amount of orientation.

As previously mentioned, the adhesive may be applied to the polyolefinic film backing at a later stage.

For example, the film may first be prepared in accordance with the procedures disclosed in the aforementioned U.S. Pat. No. 2,631,954. As described therein, a mass of molten polyolefin is deposited at the nip of the top and middle rolls in a three roll calender. The top roll, which rotates at a slower speed than the middle roll, is heated to a temperature above the melting point of the polymer; and the middle roll is heated to an elevated temperature below its melting point. The polymeric mass deposited at the nip will be extruded between the two rolls to form a layer adherent to the surface of the middle roll. It is then carried from the surface of the middle roll into contact with the lower roll rotating at the same speed as the middle roll but chilled relative thereto, e.g. to 50°–70° F. The resulting sheet is stripped from the middle roll and passes around the lower roll to a takeup roll. The resulting film has different surface characteristics. While the surface adherent to the middle roll is smooth, the which may compromise the protective function of the tape over the pipe surface:

(1) the thickness differential projected at the surface of the overlap results in increased frictional resistance when the pipe moves against the soil and/or against any support skids, which high frictional resistance may result in a failure of the overlap bond and/or wrinkling of the tape, thereby ultimately permitting diffusing liquid to corrode and damage the pipe;

(2) the thickness differential at the underside (bottom) of the overlap results in the formation of an interstice at the termination of the lower adherent (tape wound closest to the pipe), which interstice running along the length of the pipe as a spiral is called "the spiral void," the presence of which eventually results in corrosion of the metal pipe; and (3) when the protective tape is subjected to the action of soil stresses and application tension (residual stresses), the overlap bond is pulled apart; severe cleavage stresses are induced at the terminal points of the overlap when it is pulled apart in this fashion, causing a stress concentration on the overlap edges which may result in failure of the overlap bond.

The physical problems such as spiral void can in theory be substantially eliminated if the adhesive wrap could be adhered completely to the underlying substrate. However, this is not feasible with the wrapping operations which would normally be applied in the field.

The principles of shrink wraps, such as are commonly employed with thin films for packaging foodstuffs, would theoretically provide a solution to this problem.

However, prior to the present invention no satisfactory method of applying the principles of heat shrinkable films to pipewraps has been found for reasons previously discussed in the "Background of the Invention".

As mentioned, from a chemical standpoint, the most effective anti-corrosion coating system for resisting environmental forces such as soil stress utilizes a rubber-based adhesive and a polyolefinic outer wrap or adhesive backing A typical rubber-based adhesive for this purpose may, for example, include a rubber blend of virgin butyl rubber, reclaimed butyl rubber and/or natural rubber along with tackifiers, fillers and various other components performing specific desired functions, e.g. antioxidants, bactericides, crosslinking agents, etc.

It may for example be a rubber-based adhesive such as is described in U.S. Pat. No. 4,268,334 issued to George M. Harris and Samuel J. Thomas or U.S. Pat. No. 4,472,231 issued to Robert F. Jenkins, both of which are assigned to the assignee of the instant invention.

Preferred backing materials are the polyolefins, particularly homopolymers or copolymers of ethylene, including blends of polyolefins with other polyolefins and/or other polymeric materials.

In accordance with the present invention, novel heat shrinkable films and tapes are provided which are particularly useful as protective pipewraps. It will however be appreciated by those skilled in the art that these films and tapes will also find utility in other applications such as, for example, protective wraps for cables, wires, wire splices and the like.

In a preferred embodiment of this invention, novel heat shrinkable rubber-based adhesive tapes are provides, as well as novel processes for preparing them.

In accordance with this preferred embodiment, a polyolefin film is first oriented by stretching and then irradiated with low energy EB to provide a depthwise differential crosslinking, as will be discussed in more detail hereinafter.

At some stage in the process before or after crosslinking, the desired adhesive layer, e.g. a pressure-sensitive rubber-based adhesive, as described above, is applied to the film.

In the preferred embodiment of the invention, the film is formed and the adhesive coating applied in a single calendering step. Calenders suitable for this purpose are per se known in the art and accordingly comprise no part of this invention, e.g. the three-roll calenders and the applications thereof which are described and claimed in U.S. Pat. Nos. 2,631,954 issued to Willard M. Bright and 2,879,547 issued to James F. Morris, both assigned to The Kendall company, the instant assignee. As described in detail in the '547 patent, a polyolefinic bank of material may be supplied between the nip of the upper and middle rolls at a temperature above its melting or softening point to provide a polyolefinic film which adheres to the middle roll as it rotates toward the third (bottom) roll. A bank of molten adhesive deposited at the nip between the middle and bottom roll then causes an adhesive layer to be applied to the free outer surface of the film as it passes between the middle and bottom rolls to form the adhesive tape which is transported to a takeup roll where it is wound. The speed of rotation of the respective rolls, their temperature, and the gaps between adjacent rolls are all opposed surface is rougher and has a matte appearance. As is explained in Col. 4, the upper roll surface, advancing at less speed, causes drag on the material so that the upper surface of the sheet comes off the upper roll at a speed greater than the speed of the upper roll, causing the roughness as well as a difference in the degree of a molecular orientation through the thickness of the sheet with an internal molecular orientation greater than the molecular orientation at the smooth surface. The differential surface characteristics are preserved in the film after cooling and are an inherent characteristic of the film.

As is further pointed out in Col. 4, when the speed ratio of the middle to top roll is maintained in the range of 5:1 to 30:1, the polymer mass is subjected to a dragging action resulting in a longitudinal molecular orientation.

In accordance with the present invention, it has now been discovered that by adjusting the speed to a higher ratio, e.g. to from about 35:1 to about 200:1 this orientation may be entirely sufficient to achieve the desired degree of heat shrinking. Alternatively, if found desirable or expedient to do so, the film so formed may be subjected to further orientation by stretching to achieve the desired shrinkability, e.g. a total stretching on the order of 10-200%, as previously stated.

In any event, polyolefinic film prepared in the foregoing manner is particularly suitable for the practice of this invention. The matte or rougher surface possesses highly favorable adhesive receptive and retentive characteristics. It will accordingly be appreciated that the rougher surface is the surface to which the adhesive will be coated at some stage before or after irradiation to achieve the differential crosslinking.

The method of coating the adhesive on the film backing is not critical and this may be accomplished by any of the per se known systems for applying an adhesive layer to a backing material, e.g. calendering, extrusion coating and the like. As previously stated, the adhesive may be applied prior to or after the differential crosslinking step.

The crosslinking step is carried out by irradiation in such a manner that the receives the greatest dosage of incident radiation is deposited at or near the irradiated surface (e.g. the smooth surface of the film described above) and the dosage decreases depthwise due to absorption of the penetrating ionizing radiation to a point where the lower surface area receives at the most an insignificant amount of radiation. This in turn provides maximum crosslinking at the irradiated surface, the degree of crosslinking decreasing depthwise through the thickness of the film to a point at or near the opposed (non-irradiated) surface of the film where no significant amount of crosslinking has occurred In this context, it is to be noted that theoretically or conceptually no crosslinking should occur at or near the opposed surface. However, it will be appreciated that whether or not some minimal innocuous crosslinking does in fact occur may not be capable of analytical determination. It is critical to the practice of this invention that any such crosslinking at or near the opposed surface which may incidentally occur must be so minimal that it does not cause any of the problems heretofore noted, namely damage or destroy the properties of an adhesive coated on this surface, or if no adhesive coated prior to irradiation, the ability of the opposed surface to provide the requisite cohesion with an adhesive subsequently coated thereon. Accordingly, as used herein and in the appended claims, the term "substantially no crosslinking" or "substantially no irradiation" denotes that either no irradiation and subsequent crosslinking occurs or, if any does in fact occur, it is so minimal as to be innocuous.

The dosage of irradiation which is employed to achieve the differential crosslinking in accordance with this invention is not capable of precise quantification. As is understood by those skilled in the art, it will depend in part upon the particular materials employed and is in part dependent upon the particular thickness of the irradiated layer, as well as the energy of the charged particle.

When charged particle irradiation, e.g. EB, penetrates a material, the energy absorption after an initial high value falls off very rapidly. For charged particles, the energy absorption in the material is dependent upon the nature and energy of the charged particle and the density and thickness of the material Accordingly, one may alter the amount of energy absorbed per unit depth in a specific material (and hence the amount of crosslinking resulting as a function of this absorbed energy) by the proper selection of charged particles and energies.

Conceptually, either neutral or charged particles, or electromagnetic radiation can produce differential crosslinking and hence may be employed in the practice of this invention. However, the preferred source of radiation is electron beam (EB) and, specifically, low energy EB.

In any event, the type of radiation and the dosage employed must be selected to cause the differential crosslinking while at the same time transmitting sufficient radiation to respective unit depths of film material where subsequent portions of radiation are absorbed to cause progressively less crosslinking until, finally, little or no radiation is left to penetrate to the opposed surfaces to cause crosslinking.

With the relatively thin films generally contemplated, radiation such as neutral or neutron particles will in general possess too much penetrating power so as to penetrate throughout the thin film and thus cause the unwanted crosslinking throughout the thickness, including the opposed surface. Low energy EB, on the other hand, is quite satisfactory with such thin films In any event, the selection of the source of radiation as well as the dosages to be employed with a given material will at most require routine calculations within the judgment of the skilled worker in the light of the foregoing discussion.

The polyolefinic materials which may be employed may in general be characterized as being heat shrinkable (or as they are sometimes referred to in the art) heat recoverable materials having the properties of elastic memory imparted to them by the crosslinking. The preferred materials are the polyethylenes, e.g. low density polyethylene (LDPE), medium density polyethylene (MDPE), high density polyethylene (HDPE), very low or ultra low density polyethylene (VLDPE), and linear low density polyethylene (LLDPE), including blends thereof.

As examples of other useful polymers contemplated by this invention, mention may be made of ethylene vinyl acetate copolymers, ethylene propylene rubber, EPDM, polypropylene, polyvinyl chloride, polyisobutylene, conjugated diene butyl, butyl rubber, etc.

The following examples show by way of illustration and not by way of limitation the practice of this invention

EXAMPLE 1

A polyethylene film was first prepared in known manner by first forming a melted 2:1 blend of of LPDE:HDPE including carbon black on a 2-roll mill and then calendering the resulting blend in accordance with the procedures described in the aforementioned U.S. Pat. No. 2,631,954 to provide a black polyethylene film twelve inches wide and about 30 mils thick and characterized in that one surface is smooth and shiny and the other is rough, as previously described The resulting film was then stretched in the machine direction at a temperature of about 263° F. to provide an oriented film about 9 5 inches in width and 20 mils thick From the reduction in thickness and width, the machine direction draw (elongation) was calculated as about 80%.

EXAMPLES 2-5

Four two foot lengths of the oriented film prepared in Example 1 were irradiated on their shiny side with a low energy electron beam under irradiation conditions as set forth below in Table 1. Actual surface doses were not measured but were taken from the dosage calibration on the device employed, an "ELECTROCURTAIN" (trademark of Energy Sciences, Inc. for an electron beam processor.) Radiation monitors were employed on both surfaces of the samples exposed to 15 and 20 Mrad. The top (irradiated) surface monitors showed a complete color change; while the bottom (non-irradiated) surface monitor indicated no visible color change. The radiation dose reaching the bottom surface is estimated to be less than 0.1 Mrad. This is consistent with depth-dosage profiles for the ELECTROCURTAIN which indicate no detectable dose should be found at the opposed surface of a 20 mil polyethylene sheet.

TABLE 2

| EXAMPLE | VOLUME CHANGE (%) | SURFACE DOSE (Mrad) | TEMPERATURE (°C.) | MD SHRINK (%) | CD EXPANSION (%) | THICKNESS EXPANSION (%) |
| --- | --- | --- | --- | --- | --- | --- |
| 2 |      | 5  | 95  | −0.9 | +0.3  | +1.0 |
|   | +0.3 |    | 110 | −4.3 | +1.6  | +4.3 |
|   | +1.5 |    | 130 | −34.0 | −15.0 | +31.0 |
|   | −1.0 |    | 150 | [COULD NOT MEASURE] | | |
| 3 |      | 10 | 95  | −0.8 | +0.2  | +0.6 |
|   | 0.0  |    | 110 | −3.2 | +0.9  | +2.5 |
|   | +0.2 |    | 130 | −33.0 | +15.0 | +27.0 |
|   | −2.1 |    | 150 | −54.0 | +40.0 | +57.0 |
|   | +1.8 |    |     |      |       |      |
| 4 |      | 15 | 95  | −0.8 | +0.2  | −0.5 |
|   | −0.1 |    | 110 | −3.1 | +1.0  | +2.1 |
|   | −0.2 |    | 130 | −33.0 | +17.0 | +24.0 |
|   | −2.1 |    | 150 | −47.0 | +35.0 | +42.0 |

TABLE 2-continued

| VOLUME CHANGE (%) | EXAMPLE | SURFACE DOSE (Mrad) | TEMPERATURE (°C.) | MD SHRINK (%) | CD EXPANSION (%) | THICKNESS EXPANSION (%) |
| --- | --- | --- | --- | --- | --- | --- |
| +1.5 | | | | | | |
| 5 | | 20 | 95 | −0.7 | +0.2 | +0.4 |
| −0.2 | | | 110 | −3.7 | +1.5 | +2.9 |
| +0.5 | | | | | | |
| | | | 130 | −27.0 | +15.0 | +16.0 |
| −2.2 | | | 150 | −37.0 | +25.0 | +24.0 |
| −2.2 | | | | | | |

EXAMPLE 6

The films prepared in Example 2–5 were tested for shrinkage characteristics by heating two inch diameter circles of the films in an oven at different temperatures for 30 minutes and measuring the dimensions before and after heating. The results are set for below in Table 2. It should be noted, however, that the thicknesses after shrinking above the melting point were difficult to measure accurately in this particular experiment due to severe curling of the samples. It is postulated that this curling at the higher temperatures may also have acted as a constraint preventing the attainment of equilibrium dimensions, particularly for the samples at the low dosage which exhibited the most severe curling. The sample with a 5 Mrads surface dose showed melting on both sides at temperatures above the melting point, and was fused to an unmeasurable clump at 150° C., indicating an insufficient crosslinking at this particular dosage. At 20 Mrad, the sample at 150° C., exhibited the desired melting only on the non-irradiated side.

TABLE 1

| EXAMPLE | LINE SPEED (FT/MIN) | BEAM CURRENT (MA) | TERMINAL VOLTAGE (KV) | $O_2$ (PPM) | CALIBRATED SURFACE DOSE (Mrad) | FINAL SURFACE TEMPERATURE (°F.) |
| --- | --- | --- | --- | --- | --- | --- |
| 2 | 20 | 5 | 200 | 500 | 5 | <140 |
| 3 | 20 | 10 | 200 | 500 | 10 | <140 |
| 4 | 20 | 15 | 200 | 500 | 15 | 140 |
| 5 | 20 | 20 | 200 | 500 | 20 | 180 |

EXAMPLE 7

The film irradiated at 20 Mrad (Example 5) was tested for useful shrink properties on a metal pipe. In this experiment it was coated with 60 mils of an asphalt-rubber adhesive. A strip of the resulting pressure-sensitive tape approximately 3"×8" was wrapped on a 2" pipe and the overlap was held down with a piece of lap hold-down tape. Shrinking was accomplished by heating the whole assembly at 295° F. (about 146° C.) for five minutes. After heating, the tape provided a smooth shiny wrap which was so tightly wound around the pipe that it forced out a significant amount of adhesive from under the film tape backing. This indicated that the film shrinkage was generating sufficient constricting forces to squeeze adhesive into any underlying voids.

EXAMPLE 8

A 2" metal pipe was coated over a two inch width with a layer of rubber-based adhesive approximately 80 mils thick. A 2" wide strip of the 20 Mrad film was then wrapped over this adhesive coating and held down at the overlap with a small piece of lap sealant tape. Shrinking was accomplished by heating at 295° F. for five minutes, as in the preceding example. The resulting wrap was smooth and shiny and exhibited only about 5% CD expansion. Where the film did not cover the adhesive coating, the shrunken film was seen to have squeezed out some of the adhesive. Where the film extended beyond the adhesive edge, the film conformed tightly to the pipe and adhesive at the step off. Under the lap seal tape, there were small wrinkles, but the film was tightly bonded to itself.

From Examples 7 and 8 it will be seen that the present invention finds utility both in the form of a heat shrinkable adhesive tape, i.e. a heat shrinkable backing for an adhesive layer, and as a protective film wrap over a substrate. In the latter context, the non-irradiated surface has the property, upon heating, to bond securely to the underlying irradiated surface in the overlap so that the shrunken film will securely engage the surface of the article to be protected, in this case a metal pipe.

The foregoing examples clearly demonstrate that the differentially crosslinked film of this invention shrinks with a level of tension sufficiently high to promote adhesive flow and excellent conformability at application temperatures. Moreover, these elevated temperatures need not be tightly controlled so as to prevent film damage, as would be the case with a completely thermoplastic film The film can also adhere to itself (as well as other non-adhesive substrates) when there is no intervening adhesive layer.

Since the crosslinked (irradiated) surface adheres strongly to the uncrosslinked (non-irradiated) surface after melting and shrinking in place, it is thought that some degree of interlayer co-crystallization may take place. This would require that one layer retains the capacity for molecular diffusion, but not both.

From the foregoing examples it is also evident that the differential crosslinking has caused a major difference in the shrink characteristics of the oriented film. In the particular experiments performed, namely its composition and thickness, a surface dose between 5 and 10 Mrad was necessary to observe some effect. At a 20 Mrad surface dose, the temperature range of shrinkability which would be required for the preferred uses (a controlled shrink below 50% with some residual film strength) extends from about 120° C. to over 150° C., as compared to the narrow window of about 120° C. to 130° C. for non-irradiated film. In this context, it is important to note that below the melting point for the film, there is very little difference in shrink behavior among the films, since the relaxation processes are dominated by the residual crystallinity. Above 130° C., the crosslinked network in the outerlayer of the film of the examples holds back the shrink recovery to useful levels without preventing it entirely.

It has further been found that heat shrinkable films of this invention exhibit stress relaxation upon shrinking. This phenomenon is of great significance in the use of these films as protective wraps since it renders them more resistant to environmental stresses such as thermal contraction, cracking, impact damage and the like.

To recapitulate, the present invention relates to the concept of preparing heat shrinkable films by first orienting a polyolefinic film by stretching and then effecting a differential crosslinking throughout the thickness of the film, the greatest crosslinking being at or near one major surface and then decreasing as the distance from the irradiated surface increases to the point where the opposed major surface is effectively non-crosslinked. This differential crosslinking is accomplished with a source of radiation, preferably EB, at a dosage which is in part absorbed and in part penetrates the polyolefinic material of the film in succeeding unit depths, the dosage being insufficient to penetrate the opposed surface so as to cause crosslinking.

Tapes may be prepared by applying an adhesive coating to the film before or after crosslinking. From an manufacturing standpoint, it is preferred to apply the adhesive coating and the orientating in a single step, e.g. by calendering on the adhesive and drawing the film coming off the calendering rolls so as to provide the necessary stretching for orientation. The ability to prepare an adhesive tape in this manner, i.e. by forming an oriented tape in a single step and then irradiating in a second step to cause the described differential crosslinking constitutes Since certain changes may be made without departing from the scope of the invention herein involved, it is intended that all matter described in the foregoing specification, including the examples, shall be interpreted as illustrative and not in a limiting sense.

What is claimed is:

1. A heatshrinkable polyolefinic film having a smooth surface and an apposed rough surface, said film being oriented by stretching in the machine direction to increase its length by at least 10 percent, said film further being differentially crosslinked throughout its thickness, the greatest crosslinking being at or near said smooth surface, the extent of crosslinking decreasing as the distance from said smooth surface increases, said rough surface being characterized as being substantially free of crosslinking.

2. A film as defined in claim 1 comprising polyethylene.

3. A film as defined in claim 2 wherein said polyethylene comprises a blend of high and low density polyethylene.

4. A film as defined in claim 1 including a layer of adhesive coated on said rough surface to form a heat-shrinkable adhesive tape.

5. A tape as defined in claim 4 wherein said adhesive is pressure-sensitive.

* * * * *